June 14, 1955 S. BLOOMENTHAL 2,710,930
HAND GENERATOR
Filed Nov. 15, 1952 3 Sheets-Sheet 1
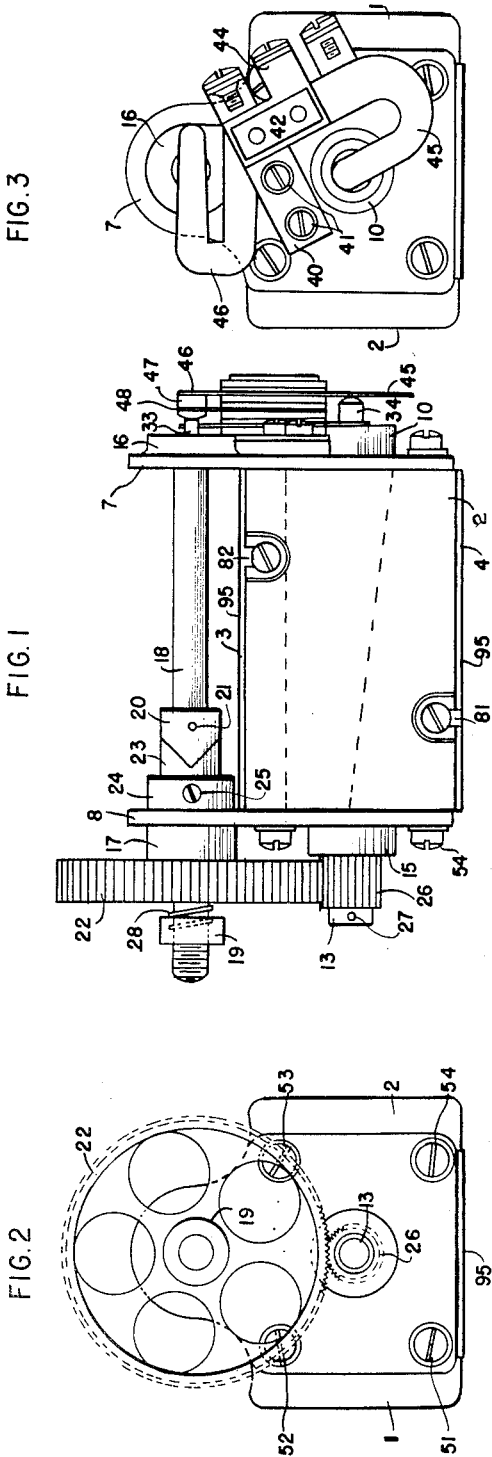
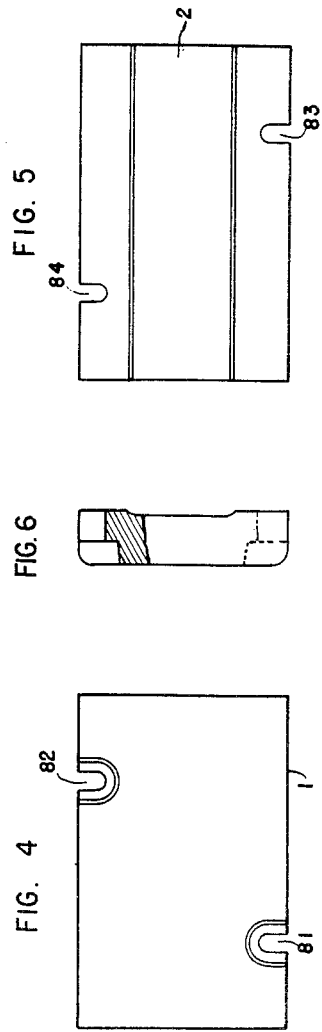
INVENTOR.
SIDNEY BLOOMENTHAL
BY
ATTY.

June 14, 1955  S. BLOOMENTHAL  2,710,930
HAND GENERATOR
Filed Nov. 15, 1952  3 Sheets-Sheet 2
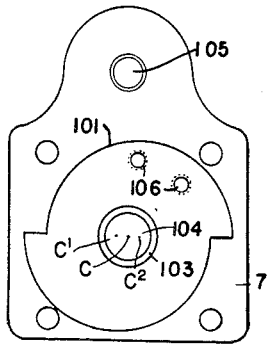
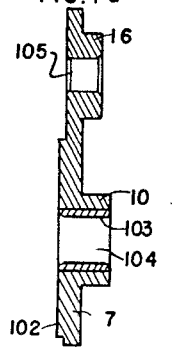
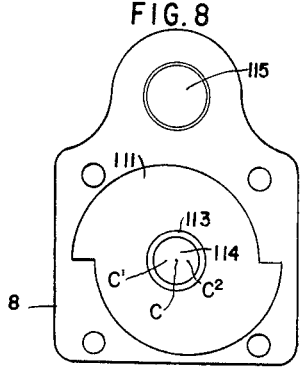
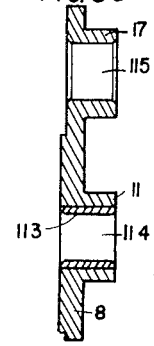
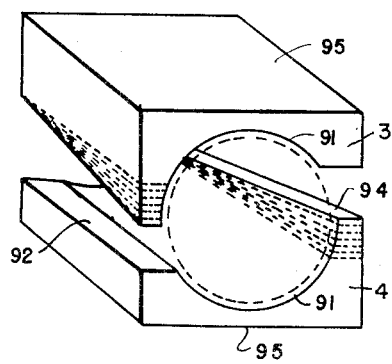
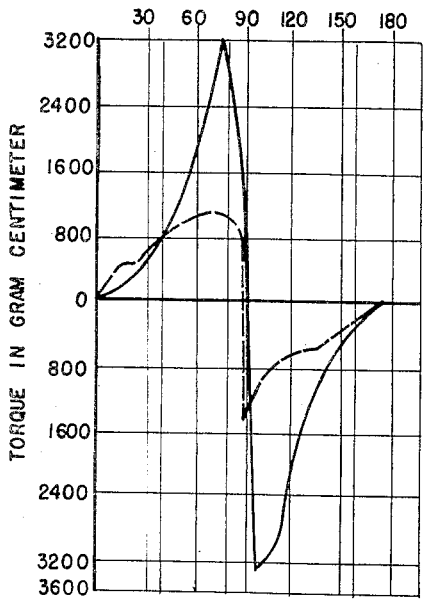
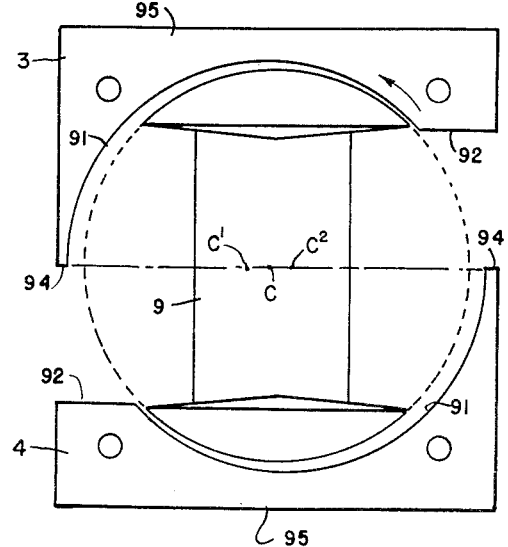
INVENTOR.
SIDNEY BLOOMENTHAL
BY
ATTY.

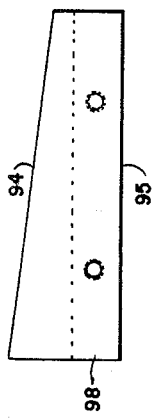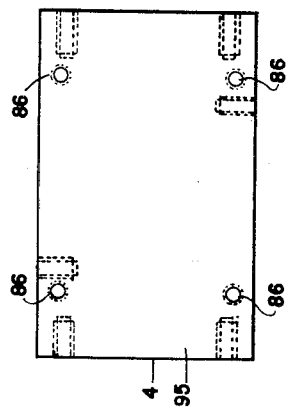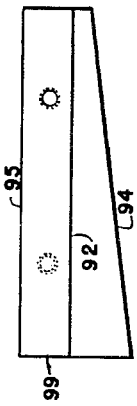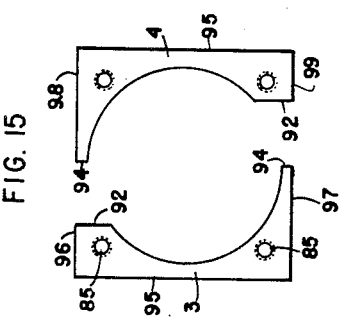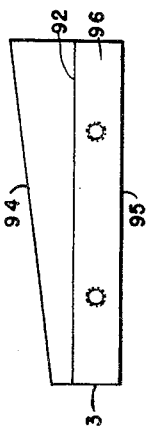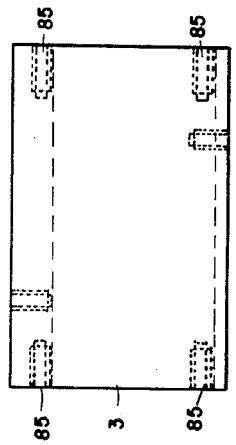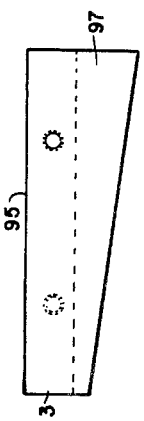
INVENTOR.
SIDNEY BLOOMENTHAL United States Patent Office 2,710,930
Patented June 14, 1955

2,710,930

HAND GENERATOR

Sidney Bloomenthal, Chicago, Ill., assignor to Automatic Electric Laboratories, Inc., Chicago, Ill., a corporation of Delaware Application November 15, 1952, Serial No. 320,793

6 Claims. (Cl. 310—154)

The present invention relates to generators. Its main object is the production of a hand generator of novel construction in order to achieve torque reduction without sacrifice of power output.

In keeping with this object, an outstanding feature of this invention is to provide trailing angular edges on the pole pieces to fit a type of generator which has been disclosed by United States Patent No. 2,133,686 granted to I. W. Cox, on October 18, 1938.

Another feature of this invention is to provide a tapered air gap by mounting the pole pieces a little bit off the center with respect to the center line of the armature. The combination of the trailing angular edges of the pole pieces with the tapered air gaps between the pole pieces and the armature reduces the torque without sacrificing power and assures easy turning and smooth running.

Still another feature of this invention is to construct new end plates with supporting semi-circular projecting portions displaced laterally from each other for properly positioning the pole pieces with respect to the armature so as to provide the tapered air gap.

Other objects of my invention will be specifically pointed out in the description forming a part of this specification.

Referring now to the accompanying drawings comprised of Figs. 1–18.

Fig. 1 is a front view of the improved generator.
Fig. 2 is an end view as seen from the left.
Fig. 3 is an end view as seen from the right.
Figs. 4 and 5 show the design of the permanent magnets.
Fig. 6 is the cross sectional view of the magnets.
Fig. 7 shows the rear end plate.
Fig. 7a is the cross sectional view of Fig. 7.
Fig. 8 shows the front end plate.
Fig. 8a is the cross sectional view of Fig. 8.
Fig. 9 is the top view of the top pole piece.
Fig. 10 shows the left side of the top pole piece.
Fig. 11 shows the right side of the top pole piece.
Fig. 12 shows the bottom view of the bottom pole piece.
Fig. 13 shows the left side of the bottom pole piece.
Fig. 14 shows the right side of the bottom pole piece.
Fig. 15 shows an end view of both pole pieces and their lateral displacement with respect to each other to provide a tapered air gap.
Fig. 16 is the end view of the two pole pieces and the armature showing the tapered air gap between the inner cylindrical surfaces of the pole pieces and the periphery of the armature.
Fig. 17 is a perspective view of the pole pieces.
Fig. 18 is a graph showing the torque reduction being accomplished through the use of the improved pole pieces of the generator.

Referring now to the drawings, Figs. 1–3 show substantially the same design of a generator as disclosed by United States Patent No. 2,133,686, granted to I. W. Cox, on October 18, 1938, provided with the improved pole pieces and end plates of the present invention.

The magnets 1 and 2 whose cross section may be seen best in Fig. 6 are substantially U-shaped in cross section with relatively short horizontal limbs.

In addition to the magnets 1 and 2 and the pole pieces 3 and 4, the main structure of the generator includes the end plates 7 and 8, as best seen in Figs. 7 and 8, with supporting projecting portions such as 101 and 111. Each of the projecting portions has an irregular outline formed of two semi-circles, each having a center offset from that of the other. Furthermore, both centers of each of the outlines of each of the projecting portions are equally and slightly displaced from the center line or axis of the armature, so that they are both laterally displaced with respect to the center line of the armature as well as being laterally displaced with respect to each other.

Inside of the end plate 7 and flange 10, as seen in Figs. 7 and 7a, there is a bearing hole 104 formed by bearing 103 in which the armature shaft rotates. Flange 16 of the upper part of the end plate 7, whose cross sectional view can be clearly seen in Fig. 7a has a hole 105, in which the crank shaft 18 rotates. Threaded holes 106 are provided on the semi-circular portion 101 for securing the spring assembly such as shown in Fig. 3.

Referring to Figs. 7, 8 and 16, the displacement of the centers of the semi-circular sections of projections 101 and 111 causes the pole pieces 3 and 4, when positioned on these portions, to be laterally displaced with respect to the armature 9.

Inside of end plate 8 and flange 11, there is a bearing hole 114 formed by bearing 113, in which the armature shaft rotates. End plate 8 and flange 17, whose cross sectional view can be seen in Fig. 8a, has a hole 115, in which the crank shaft 18 rotates. As best seen in Fig. 1, the crank shaft 18 is driven by driving wheel 22, which is in mesh with armature pinion 26, which, in turn, rotates the periphery of the armature along the path as indicated by the dotted line in Fig. 16. Since the projecting portions of the end plates are displaced with respect to the periphery of the armature and since the pole pieces are so positioned by the projecting portions of the end plates, the pole pieces are thereby displaced laterally with respect to the armature. Three centers are seen in Fig. 16, wherein C represents the axis of the armature, C1 and C2 represent respectively the axes of the inner surfaces of the top and bottom pole pieces. It, therefore, follows that a tapered air gap, which can be clearly seen in Fig. 16, is formed between the inner curved surfaces 91 of the pole pieces and the armature, as the latter rotates in the direction of the arrow. Since the poles always move away from the narrowest part of the gaps during the course of rotation, the air gaps gradually increase and are therefore, known as divergent.

The armature 9, as is shown in Fig. 16, is of the usual shuttle type construction, giving ample space for the armature winding. The armature is provided with the usual end plates (not shown) into which the armature shaft members 13 and 34 are placed and are secured by an operation known as "staking."

Flanges 16 and 17 for the crank shaft 18 are formed integrally with the end plates 7 and 8. The crank shaft stop-collar 19, threaded on the inside, is screwed onto the end of the crank shaft 18 to limit the endwise movement of a crank shaft 18 imparted by the inter-action between the cam collar 20 and the cam cut in the sleeve 23 forming an extension of driving wheel 22. Cam collar 20 is held in position by pin 21 (see Fig. 1). This endwise movement of crank shaft 18, it will be understood, takes place when the crank is turned by the handle (not shown), in order to shift the spring combination by means of the thrust action of buffer 33 composed of insulating material and fitted snugly in a hole in the end of crank shaft 18. The coil spring 28 restores the crank shaft 18 endwise to the position shown in the drawings when the crank is released. The assembly composed of the crank shaft and the driving wheel is held in position by the collar 24, secured to sleeve 23 by the headless set screw 25.

Armature pinion 26, seen best in Figs. 1 and 2 is fitted over the end of shaft member 13 and is secured in place by pin 27.

One end of the armature winding is soldered to a lug (not shown), which is secured to the front armature end plate. The other end of the armature winding is secured to another lug (not shown), secured to the rear armature end plate which holds the contact stud 34 in place by means of a nut (not shown). The contact stud assembly is insulated from the metallic frame structure of the armature by means of bushing or washer composed of insulating material as shown in the previously mentioned Cox patent.

As seen in Figs. 1 and 3, a spring assembly mounted on bracket 40, is similar to the spring assembly of the Cox patent and is secured to the rear end plate 7 by screws 41.

Each of the pole pieces, as shown in Figs. 9 to 17, have an outer flat surface 95, an outer left side 96, an outer right side 97 and an inner surface. The inner surface comprises a cylindrical, or concave surface 91 and two other flat surfaces 92 and 94. Flat inner surface 92 is of rectangular shape and is parallel to the outer surface 95. Flat inner surface 94 is trapezoidal in shape and is angularly displaced with respect to the outer surface 95. The outer left side 96 of pole piece 3, as shown in Fig. 10, is of rectangular shape and has two threaded holes for securing the permanent magnets to the pole piece by means of screws. The outer right side 97 of pole piece 3, as shown in Fig. 11, is of trapezoidal shape and likewise has two threaded holes for securing the permanent magnets to the pole piece. It will be noted that the thickness of pole piece 3 on the trapezoidal shaped inner surface 94 diminishes from one end of the pole piece to the other end as shown by the lower dotted line in Fig. 9. The shape of the inner surface 94 and the difference in the thickness of the pole piece along this surface is due to the outer side 97 being cut at an angle with respect to the center line of the inner cylindrical, or concave surface 91.

Turning briefly now to Figs. 12–14, the design of the bottom pole piece 4, as already pointed out, is substantially the same as that shown in Figs. 9–11 with the exception of four holes, such as 86 being used for mounting purpose.

Referring particularly to Fig. 9, the ends of the pole pieces have threaded holes such as 85 for securing the pole pieces to the end plates by means of machine screws. As already pointed out the inner surface 91 of the top pole piece is hollowed out in a cylindrical shape so as to form the upper section of the armature chamber. In the same manner, the lower section of the armature chamber is formed by the bottom pole piece by means of its inner cylindrical shaped surface 91.

Turning now to Figs. 4 and 5, the magnets 1 and 2 are pre-cast to the desired size and shape and are machine ground only on their pole faces where they maintain metal-to-metal contacts with the pole pieces 3 and 4 respectively. It is noted that the magnets are cast with open slots 81—84, through which the magnet mounting screws may pass.

The curves of Fig. 18 show the amount of torque produced in the hand generator of United States Patent No. 2,133,686 and the amount of torque produced in the present invention with the improved pole pieces. The horizontal line represents in degrees the counterclockwise rotation of the armature shaft, while the vertical line represents the torque value in gram centimeters. The full line curve represents the maximum torque observed for the standard designed generators for the above reference patent, which reaches as high as positive 3200 gram centimeters as well as negative in a complete revolution, whereas the dotted curve shows the torque reduction to positive 1125 gram centimeters through the use of the improved pole pieces having the tapered air gap and trailing edges of the present invention.

Having described the invention what I believe to be new and desire to protect by Letters Patent is set forth in the following claims.

What is claimed is:

1. In a hand generator, an armature chamber and an armature rotatable within said chamber, pole pieces forming two sides of said chamber, permanent magnets forming the other two sides of said chamber, and end plates forming the two ends of said chamber, bearings in said end plates for rotatably mounting said armature, a portion of each end plate projecting into said chamber, each said portion formed of two semi-circular sections each upper section being laterally displaced with respect to its lower semi-circular section and the radius of each semi-circular section being laterally displaced with respect to the center line of said armature and bearings, each pole piece having an inner cylindrical surface positioned on said end plates by means of said laterally displaced projecting semi-circular sections to thereby form a variable air gap between the armature and said inner cylindrical surfaces for reducing the torque as the armature is rotated in said chamber.

2. In a hand generator, an armature chamber and an armature rotatable within said chamber, pole pieces forming two sides of said chamber, an inner cylindrical surface in each of said pole pieces forming part of said armature chamber, means whereby said cylindrical surface of one pole piece is laterally displaced with respect to the cylindrical surface of the other pole piece and whereby both cylindrical surfaces are laterally displaced with respect to the center line on which said armature rotates, said lateral displacement creating a variant air gap between said surfaces and said armature when said armature is rotated in said chamber to uniformly reduce the torque of the hand generator.

3. A generator comprising in combination, two pole pieces, permanent magnets secured to said pole pieces, two end plates secured to said pole pieces, and an armature mounted for rotation in said end plates, each pole piece having an inner cylindrical surface; two projecting semi-circular sections on each end plate for positioning said pole pieces, one projecting semi-circular section of each end plate being displaced laterally with respect to said other projecting semi-circular section of the corresponding end plate, said cylindrical surfaces of said pole pieces being positioned on said projecting sections of said end plates to form an armature chamber having one half of the cylindrical chamber laterally displaced with respect to the other half of said chamber and from the center line of said armature, whereby the air gaps between the armature and said pole pieces vary in accordance with said lateral displacement to gradually reduce the torque and assure easy turning.

4. A generator comprising, in combination, a rotatable armature and two pole pieces, each of said two pole pieces comprising an outer flat surface and an inner surface; said inner surface comprising an inner cylindrical surface, an inner rectangular surface on one side of said cylindrical surface parallel with the outer surface, and an inner trapezoidal surface on the other side of said inner cylindrical surface; said inner trapezoidal surface being formed by a trailing edge adjacent to the inner cylindrical surface, and said trailing edge being angularly displaced with respect to the center line of said armature to thereby gradually reduce the torque as the armature is rotated.

5. In a hand generator, an armature, two end plates each having two projecting sections of semi-circular shape, two pole pieces, each of said pole pieces having an outer flat surface and an inner surface, said inner surface having a cylindrical surface and two flat inner surfaces, one flat inner surface being rectangular in shape and being parallel to the center line of said armature, and the other flat inner surface being trapezoidal in shape and being angularly displaced with respect to the center line of said armature for reducing torque, said inner cylindrical surfaces of said pole pieces being positioned on said projecting sections of said end plates, means including said projecting sections for laterally displacing said cylindrical surface of one pole piece with respect to the cylindrical surface of the other pole piece and for laterally displacing both cylindrical surfaces with respect to the center line on which said armature rotates, said lateral displacements creating a variable air gap between the armature and said inner cylindrical surface for further reducing the torque upon the rotation of said armature.

6. A generator comprising, in combination, two pole pieces, permanent magnets secured to said pole pieces, two end plates secured to said pole pieces and an armature mounted for rotation in said end plates, each pole piece comprising an outer flat surface and an inner surface; said inner surface having an inner cylindrical surface, an inner rectangular surface on one side of said inner cylindrical surface parallel with the outer surface, and an inner trapezoidal surface on the other side of said inner cylindrical surface; said inner trapezoidal surface being formed by a trailing edge adjacent to the inner cylindrical surface, said trailing edge being angularly displaced with respect to the center line of said armature to thereby gradually reduce the torque as the armature is rotated; two projecting semi-circular sections on each end plate for positioning said pole pieces, one projecting semi-circular section of each end plate being displaced laterally with respect to said other projecting semi-circular section of the corresponding end plate, said cylindrical surfaces of said pole pieces being positioned on said projecting sections of said end plates to form an armature chamber having two semi-circular sections laterally displaced from each other and from the center line of said armature whereby the air gaps between the armature and said pole pieces vary in accordance with said lateral displacement to further reduce the torque.

References Cited in the file of this patent

UNITED STATES PATENTS

| | | |
|---|---|---|
| 855,713 | Le Pontois | June 4, 1907 |
| 2,133,686 | Cox | Oct. 18, 1938 |